June 26, 1956  F. A. PAYNE, JR  2,752,112
STEERABLE AND RETRACTABLE AIRCRAFT LANDING GEAR
Filed March 31, 1953  3 Sheets-Sheet 1
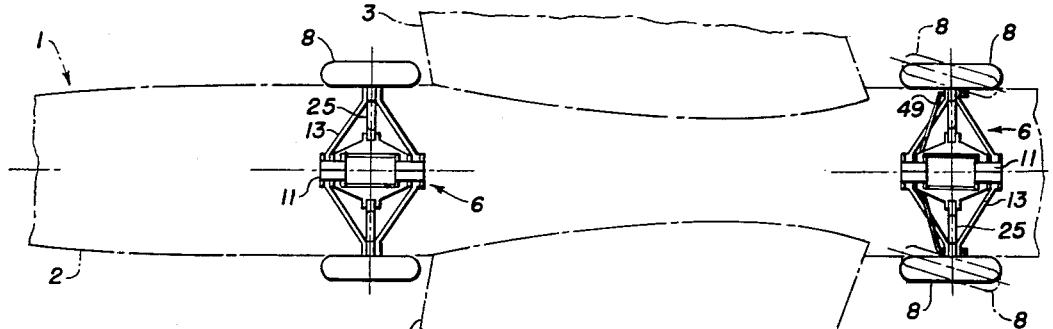
Fig. 2
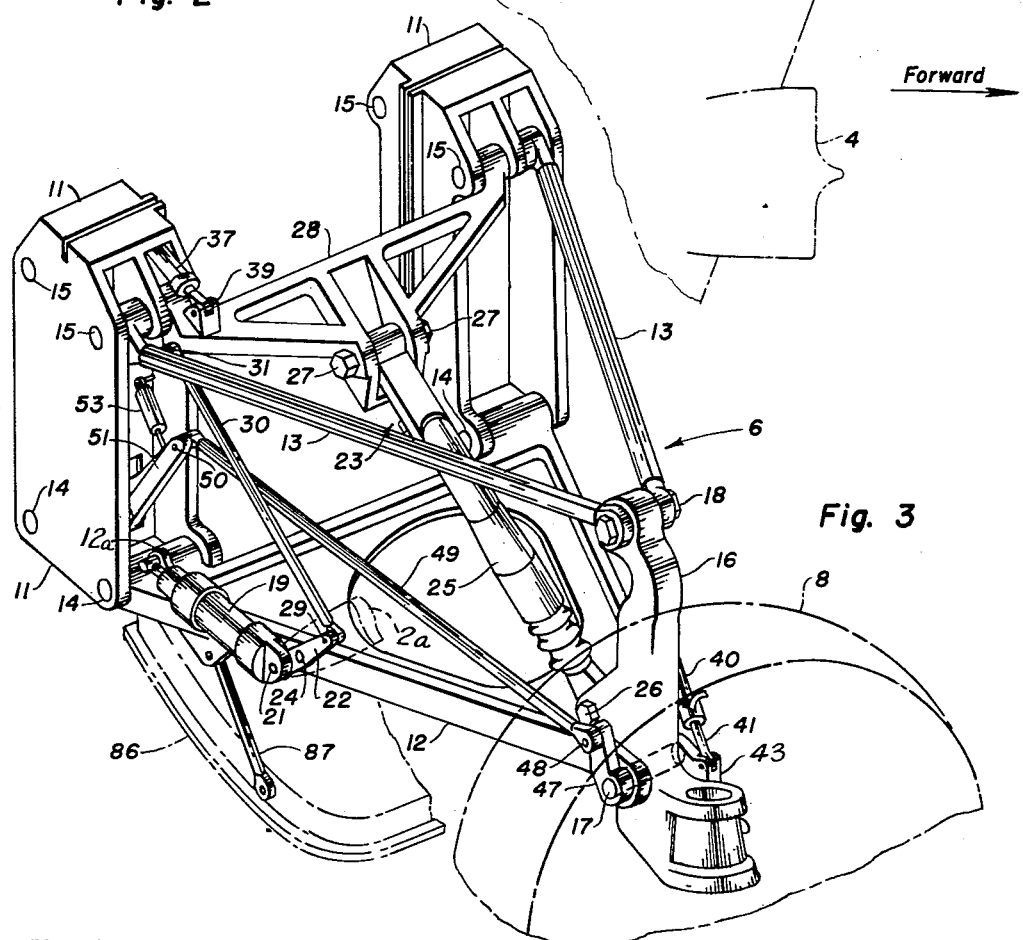
Fig. 3
Fig. 1
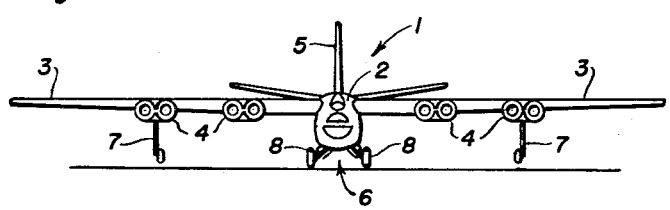
Fred A. Payne, Jr.
INVENTOR.
BY
HIS PATENT ATTORNEY

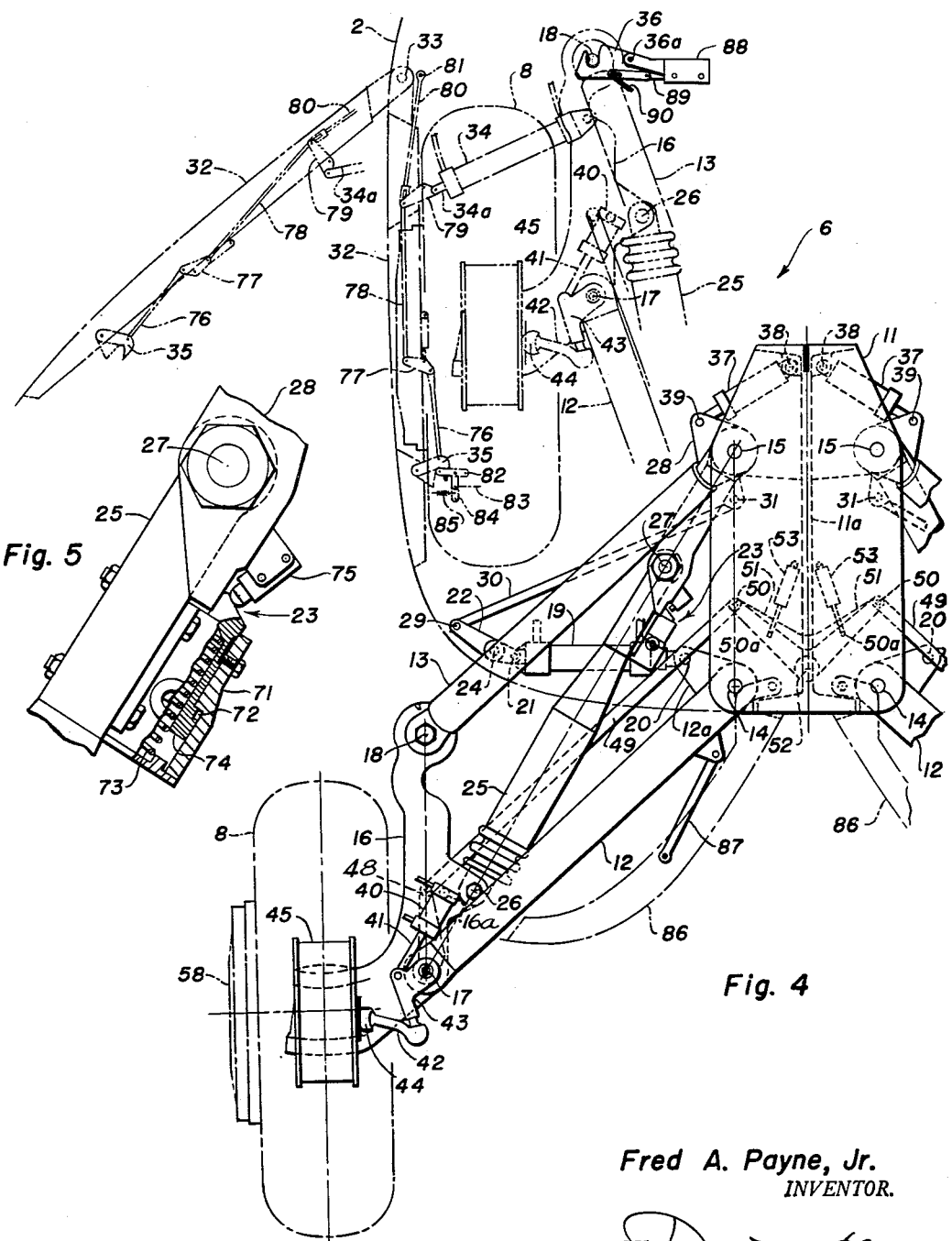

June 26, 1956 F. A. PAYNE, JR 2,752,112
STEERABLE AND RETRACTABLE AIRCRAFT LANDING GEAR
Filed March 31, 1953 3 Sheets-Sheet 3

Fred A. Payne, Jr.
INVENTOR.

BY
HIS PATENT ATTORNEY

United States Patent Office 2,752,112
Patented June 26, 1956

1

2,752,112

STEERABLE AND RETRACTABLE AIRCRAFT LANDING GEAR

Fred A. Payne, Jr., Playa Del Rey, Calif., assignor to North American Aviation, Inc.

Application March 31, 1953, Serial No. 345,760

8 Claims. (Cl. 244—102)

The present invention relates in general to landing gears and more particularly to improvements in the arrangements and components of steerable retractable landing gear units for aircraft and like vehicles.

The present invention relates to an improved retractable landing gear of the four main wheel or quadricycle type which may be supplemented by outboard stabilizing units. The present improvement is directed toward the advantages of a compact, retractable landing gear which may be housed directly within the fuselage without undue interference with the structural members thereof. The arrangement of the landing gear is such that the wheels are arranged in laterally disposed pairs in compact units arranged such that they provide the necessary tread width for adequate stability in operation. These units are preferably disposed fore and aft of the C. of G. of the aircraft and the front set of wheels is provided with improved steering mechanisms. The present invention also includes an improved wheel and wheel-mounting arrangement in which the spindle is wholly contained within the wheel hub and the wheel is provided externally of the spindle with an improved brake construction. The present landing gear also includes a novel arrangement of its wheel supporting strut system, a unique shock absorber disposition and an improved means for automatically centering or causing the wheels to assume parallel positions as they are retracted into the fuselage or body. The above features and advantages of the present invention together with an improved relationship of the component parts of a steerable and retractable landing gear comprise the major objectives of the present invention. Other objects, advantages and features of the present invention will occur to those skilled in the art following a reading of the present description, taken in conjunction with the accompanying drawings, forming a part hereof, in which:

Fig. 1 shows a front elevational view of an aircraft showing a preferred embodiment of the present landing gear;

Fig. 2 is a plan view of the same to an enlarged scale showing the front and rear units of the improved quadricycle landing gear;

Fig. 3 is a perspective view of one half of the forward landing gear unit shown in the preceding figures;

Fig. 4 is a front elevational view of the same showing the landing gear unit in both its extended and retracted positions;

Fig. 5 is a detail view of the breaking joint of the shock absorber strut and the associated down lock;

Figure 6:
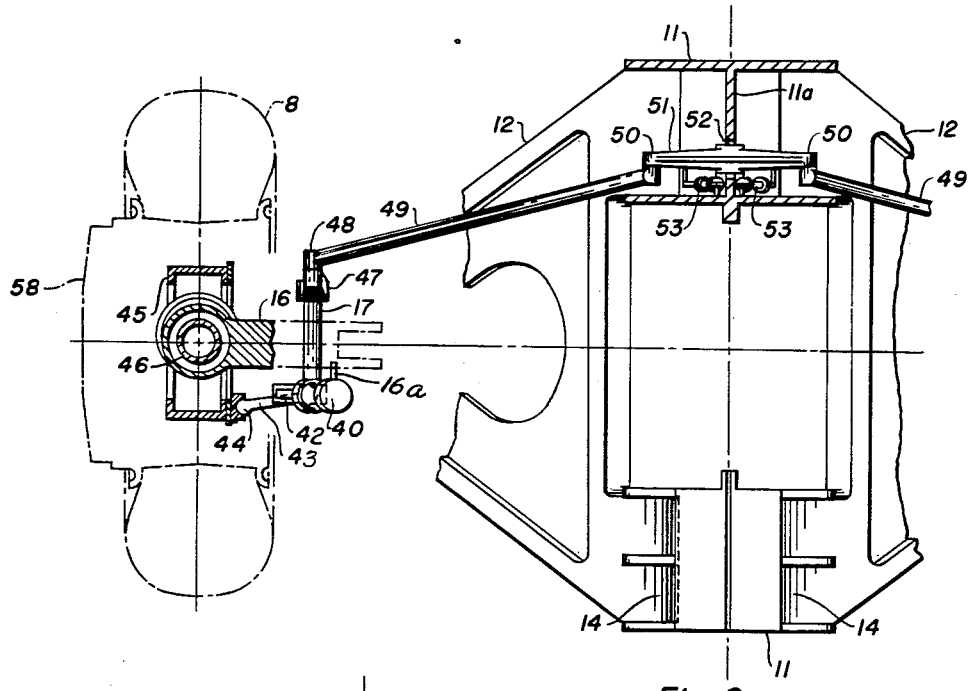
Fig. 6 is a plan view of the landing gear unit shown in Figs. 3 and 4 confined to the steering and self-centering components thereof.

Referring to Fig. 1, the numeral 1 designates an aircraft provided with a fuselage 2, laterally extending

2 sweptback wings 3 and a plurality of wing-supported jet power plant units 4. The airplane is also provided with an otherwise conventional empennage 5 and the improved quadricycle main landing wheel arrangement 6 of the present invention. The main landing wheel system, which includes the four ground-engaging wheels 8, may be supplemented by the outboard stabilizing landing gear units 7. It will be understood however that during take-off and landing, and while at rest upon the ground the four main wheels 8 support substantially the entire weight of the aircraft, and the stabilizing units 7 are brought into play only when disturbances occur to the lateral trim of the aircraft during landing, take-off and taxiing conditions.

Referring now to Fig. 2, it will be noted that the installation comprises two substantially identical fore and aft units 6, each of which are symmetrical about the longitudinal centerline of the airplane, the arrangement comprising fore and aft pairs of wheels each laterally disposed and mounted on a common trunnion support fitting 11 fixedly attached to the fuselage framework. The fitting 11 has a central web 11a and forms the structural support for the pair of wheels on each side of the fuselage. As may be more particularly seen in Figs. 3 and 4, the wheel supporting means consists of a four-bar linkage wherein the parallel members 12 and 13 attach at their upper and inner ends to the trunnion 11 at the vertically spaced pivots 14 and 15, respectively, and are pivotally attached to the landing gear spindle arm 16 at the similarly vertically spaced pivot pin connections 17 and 18, respectively. The lower member 12 is in the form of a triangular fitting reinforced by means of a central web provided with a lighting hole, and the upper member 13 comprises a V-shaped tubular unit.

Retraction of the landing gear is effected by means of a hydraulic cylinder 19 having its piston portion pivotally mounted at 20 upon the laterally extending lug 12a integral with the upper end of the member 12. The retracting cylinder 19 has its cylinder head portion pivotally connected at the opposite end at the pivot 21 to one end of the bell-crank lever 22 which is pivotally mounted upon the fuselage structure 2a at 24. A central "liquid-spring" type shock absorbing strut 25 is pivotally connected at its lower outer terminal by the pivot 26 to an inwardly extending lug on the spindle arm 16 and the strut 25 is pivotally connected at its upper inner terminal at the pivot 27 to a triangular fitting 28 which is independently journalled at the pivot axis 15 on a common longitudinal, or fore and aft, centerline aligned with the pivot axis of the upper strut member 13. The strut 25 may preferably be of the type which is devoid of springs but depends for its resilience upon the compressibility of the shock absorber fluid, and it is to be noted that the pivot 26 may be located at any point along the spindle arm 16 or the member 12, other than at the pivot pin connections 18 and 14, respectively, although the preferable location is deemed to be on or in the vicinity of the pivot pin connection 17 as shown. The bell-crank lever 22, which is pivotally mounted at 24, is pivotally connected at its outer terminal by pivot 29 to the push-pull link 30, which in turn is pivotally connected at its upper inner terminal by the pivot 31 to a downwardly extending lug on the fitting 28.

It will accordingly be noted that the pivot pin connections 14, 15, 17 and 18 form a deformable parallelogram comprising the opposite and parallel sides 12—13 and 11—16 and having for its diagonal the shock absorbing strut 25 and its aligned and associated fitting 28 to which it is pivotally connected at 27. The shock absorbing strut 25, as stated above, is of the "liquid-spring" type which absorbs appreciable loads with relatively limited change in length and comprises, with the fitting 28, a break-link strut capable of breaking inwardly about the intermediate pivot 27 when the bolt of the down-lock pin assembly 23 is retracted or withdrawn. Accordingly, as viewed in Fig. 4, when the pivot 27 of the break-strut 25—28 is moved toward the right and the retracting cylinder 19 is extended it imparts parallel retraction of the assembly in the clockwise direction about the inboard pivots 14 and 15. Therefore, during such retractive movements, as well as deflection of the strut system due to landing impacts, the pivot pin connections 17 and 18 are maintained one above the other in a vertical relationship; and the wheel assembly 8 is also maintained in its normal vertical position both when fully extended and when fully retracted, as well as in all intermediate positions. A wheel-fairing door is pivoted upon the fuselage at the pivot 33, being actuated by the cylinder 34 and its piston 34a and retained in its retracted position by the lock 35.

A snubber unit 37 is pivotally attached to the central support fitting 11 at the pivot 38 and its piston terminal is pivotally connected at the pivot 39 to an upstanding lug on the fitting 28. This snubber unit 37 serves to absorb the energy of the extending gear which is dropped by gravity when the door 32 is open and the up-lock 36 is released. The energy absorbed in the snubber unit 37 is utilized to insure the movement of the point 27 on the shock strut break-link going to the latched position whereby the landing gear down-lock 23 may be secured. This down-lock 23, as shown in detail in Fig. 5, is hydraulically actuated, being housed within the cylinder casing 71 defining the chamber 72 and a locking piston portion 74 urged into its locking or engaging position by the compression spring 73. When in the locked position shown in Fig. 5, the engaging bolt or tongue at the external end of the locking piston 74 engages the micro-switch 75 for suitable indication to the pilot that the breaking strut is in locked condition, and also initiates the desired sequence operation of the solenoid-operated valves controlling the opening and closing of the fairing door 32.

As indicated above, the construction of the front and rear landing units 6 is substantially identical with the exception that provision is made for steering the wheels of the forward landing gear unit while a pin is provided through the spindle arm of the rear wheels to prevent rotation about their vertical axes. Steering of the front wheels is accomplished by means of the small hydraulic power cylinder 40, which is pivotally attached to the spindle arm 16 by the pivot 16a, while the piston 41 of which is pivotally connected to a steering arm 43, which in turn is fixedly mounted on the pivot pin 17. A short link 42 is attached to the lower end of the steering arm 43 and is attached by universal means such as a ball-and-socket connection 44 to the central supporting structure 45 of the wheel 8. As more particularly shown in Fig. 7, the spindle bearings 46a and 46b for the spindle 46 are mounted in the lower and outer end of the spindle arm 16 and are arranged to be positioned within the hub of the wheel 8 substantially upon the vertical centerline thereof. This arrangement provides improved operating characteristics inasmuch as the moment arm transmitting any deflection forces to the steering mechanism is held to a minimum. The construction of the steering cylinder 40 is also such that it serves in a dual capacity as a shimmy damper as well as in providing the desired deflection of the wheels for steering.

The present landing gear is further provided with means for centering or aligning the steerable forward wheels 8 into their longitudinally aligned positions in order to accomplish and facilitate their retraction, which may be initiated while they are in a deflected position. This mechanism includes an arm 47, as more particularly shown in Figs. 3, 4 and 6, having its lower end fixedly mounted on the pivot pin 17 and the pivotal connection 48 at its upper terminal connected to the link 49. The upper end of the latter is pivotally connected at 50 to a yoke 51 which is pivotally mounted at 52 upon the centerline of the main support fitting 11, as more particularly shown in Figs. 4 and 6. As shown in Fig. 4, the pivotal connection 48 lies in the plane of the pivot pin connections 17 and 18 and the pivotal connection 50 lies in the plane of the pivot pin connections 14 and 15 when the yoke 51 and the wheels 8 are centered, which arrangement permits retraction of the gear without causing deflection of the wheels concurrently therewith. The landing gear on the opposite side of the airplane (which has not been fully shown in Figs. 3, 4 and 6 for purposes of clarity) is provided with similar symmetrically disposed mechanism and has its link 49 also connected to the yoke 51 at the pivotal connection 50 whereby deflection of the wheel by the steering cylinder 40, being transmitted to the yoke 51 through the elements 43, 17, 47 and 49, is also transmitted to the other wheel through similarly disposed elements 49, 47, 17, 43 and 42. Small spring type bungees 53 having their piston portions pivotally connected to the yoke or bell-crank 51 by means of the pivots 50a serve to obtain the desired centering or aligning action when steering pressure is relieved from the cylinder 40.

Figure 7:
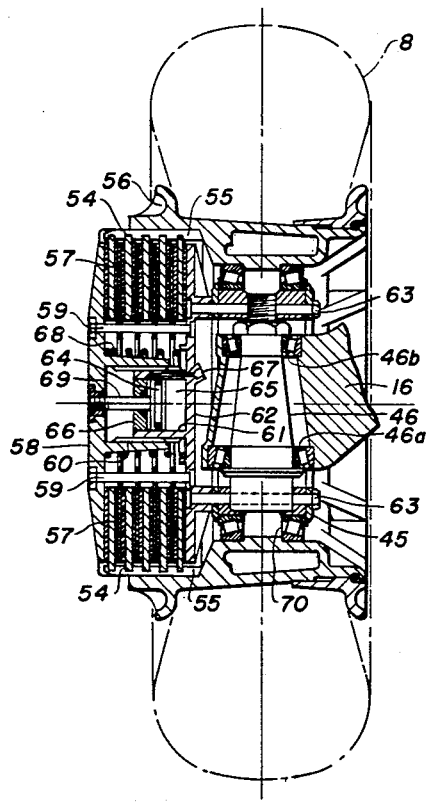
Fig. 7 is a detailed cross-sectional view of the improved wheel structure showing the spindle mounting and brake mechanism.

The details of the wheel and brake construction as well as its spindle mounting are shown in Fig. 7. As indicated above, the wheel 8 is supported from the aircraft by the spindle arm 16, within which the spindle 46 is mounted within the bearings 46a and 46b. The spindle is fixedly supported from the central supporting structure 45 on the vertical central axis of the wheel which is canted slightly downwardly and rearwardly at its lower side, as indicated in Fig. 6 to provide a suitable degree of trail. A series of friction plates 54 are secured and restrained from rotating relative to the wheel by means of the keys 55 attached to the outer and rotatable wheel structure 56. A second series of intervening plates 57 are secured in similar floating relationship to the outer plate 58 of the hub structure by means of the tie bolts 59. The member 58 is provided with an inwardly projecting cylindrical portion 60 which is splined and arranged for sliding engagement with the cylindrical projection 61 on the inner plate member 62, which in turn is secured to the inner hub structure 45 by means of the bolts 63. A piston 64 is secured in fixed relationship to the outer plate 58 by the bolt or stud 69 for operation within the chamber 65 within the cylinder 61, the outer end of which is closed by the cylinder head 66. Fluid pressure admitted at the fluid port 67 acting upon the piston 64 tends to create a telescoping action between the sections 60 and 61 whereby the outer plate 58 guided by the bolts 59 tends to be drawn toward the inner plate 62. The faces of the two series of friction plates 54 and 57 are thereby engaged to obtain the desired braking action. A return spring 68 provides for the disengagement of the plates upon release of the brakes.

The locking mechanism for the fairing door 32 is provided with a releasing arrangement comprising the lever 82 which is pivotally mounted upon the fuselage structure and is pivotally connected adjacent its mid-portion to a toggle linkage 84 shown in Fig. 4 in its aligned position. An emergency release cable 83 is connected to the toggle linkage for breaking the same and a tension spring 85 is attached to the toggle to return the same to its aligned position. The landing gear up-lock mechanism is also provided with an emergency release cable 90 which when tensioned draws the up-latch 36 downwardly in the counterclockwise direction about its pivot 36a and against the piston 89 of the cylinder 88 such that the extending pin 18 is released from the latch and the landing gear is permitted to fall by gravity into its extended position.

As indicated above, the upper fairing door 32 is pivotally connected to the fuselage structure at 33, being latched in its closed position by the locking mechanism 35 and extended into its open position by means of the hydraulic actuating cylinder 34 provided with the piston 34a. The door latch mechanism 35 is pivotally mounted upon the door structure and is interconnected to the bell-crank 77 by means of the link 76; and the bell-crank 77 is similarly interconnected to a further bell crank 79 by means of the link 78. The same terminal of the bell-crank 79 is pivotally interconnected by the link 80 to a fixed pivot 81 on the fuselage structure adjacent the door pivot 33 and a further terminal of the bell-crank 79 is pivotally connected to the piston 34a of the door actuating cylinder 34. Both of the bell-cranks 77 and 79, as well as the latch 35, are pivotally mounted upon the door structure and move therewith as the door is opened. Accordingly, as fluid pressure is applied to the actuating motor 34 the piston 34a is extended outwardly rotating both bell-cranks 79 and 77 about their pivots in the clockwise direction, the lower bell-crank 77 causing the inner pivotal connection to be moved past the dead-center position of the toggle in which it draws the link 76 upwardly and outwardly imparting counterclockwise rotation to the latch 35 into its released position. Continued outward extension of the piston 34a reacting against both the pivotal connection of the bell crank 79 on the door structure and the compression of the link 80 against the fixed pivot 81 causes the door 32 to be moved upwardly to the broken line position shown in Fig. 4 at which position it permits both extension and retraction of the landing gear unit and the attached wheel 8.

With the landing gear in the extended position as shown in the full lines in Fig. 4 and the fairing door 32 in its closed position, the sequence of operation in retracting the landing gear is as follows: Hydraulic pressure is applied to the door actuating motor 34 causing clockwise rotation of the bell-cranks 79 and 77 and disengagement of the latch 35 permitting outward rotation of the door 32 in the clockwise direction about its pivot 33. With the fairing door 32 in its open position, it is then possible to apply hydraulic fluid between the piston 74 and the casing 71 of the down-lock 23 to retract the bolt therein against the opposition of the spring 73 for unlocking of the breaking strut 25 about its pivot 27. This permits hydraulic fluid to be applied to the retracting motor 19 causing its extension and clockwise rotation of the bell-crank 22 about its pivot 24, and similar clockwise rotation of the lower frame 12 about its pivot 14. The inward thrust exerted by the push-pull rod 30 in rotating the fitting 28 in the counterclockwise direction about the pivot 15 assists in the breaking of the strut about the pivot 27. As the parallelogram system of landing gear components is rotated in its parallel relationship about the inboard pivots 14 and 15, the extending pivot 18 is latched by the up-lock 36 as it reaches its terminal position shown in construction lines and the wheel 8, as well as the entire landing gear structure, is housed within the mold line of the fuselage 2.

With the landing gear in its retracted position, it is then possible to apply hydraulic pressure to the opposite end of the door actuating motor 34 to reverse the previously described operation and to rotate the door, in the counterclockwise direction about its pivot 33, into its closed position in which it cooperates with the lower door 86, pivotally connected to the frame 12 by the link 87, to completely fair the opening through which the landing gear is retracted and extended. Retraction of the landing gear also relieves the steering cylinder 40 of any steering pressure and in the event the wheels have been rotated into a deflected position at the time the retracting operation is initiated, the wheels will rapidly be brought into their centralized or aligned positions by the action of the bungee elements 53 centering the yoke or bell-crank 51 and thereby centering each of the wheels 8. It will be obvious that the opening of the fairing door 32, extension of the landing gear assembly 6 together with the lower fairing door 86 and the closing of the fairing door 32 proceeds precisely the same as the above described operation but in the reverse sequence. The sequence control mechanism for these operations may be of the type disclosed in Patent No. 2,452,787 which issued Nov. 2, 1948 for a Landing Gear System.

Other forms and modifications of the present invention, both in respect to its general arrangement and the details of its respective components, which will become apparent to those skilled in the art after reading the foregoing description, are intended to come within the scope and spirit of this invention, as more particularly set forth in the appended claims.

I claim:

1. In an aircraft, a landing gear comprising a central support member fixed to the aircraft, a pair of laterally spaced ground-engaging wheels retractably supported from said central support member, mechanism for steering said wheels in parallel planes about their respective laterally spaced axes, means for retracting said wheels upwardly and laterally inwardly into the aircraft and centering means including a spring biased bell-crank pivotally connected to said wheel steering mechanism, said centering means and said steering mechanism so arranged to maintain said wheels parallel to the longitudinal axis of the aircraft as said wheels are retracted.

2. In an aircraft, a landing gear comprising a central support member fixed to the aircraft, a pair of laterally spaced ground-engaging wheels, wheel support mechanism retractably supported from said central supporting member, hydraulically actuated mechanism for steering said wheels in parallel planes about their respective laterally spaced axes, power means including double-acting hydraulic cylinders arranged for retracting said wheels upwardly and laterally inwardly into the aircraft, and centering means including a spring-biased bell-crank pivotally mounted upon said central support member connected to said wheel steering mechanism, said centering means and said steering mechanism so arranged to maintain said wheels parallel to the longitudinal axis of the aircraft as said wheels are retracted.

3. In an aircraft, a landing gear comprising a pair of deformable parallelogram linkages extending laterally from said aircraft, wheels carried by said linkages and laterally spaced from each other, means for maintaining said linkages in an extending wheel ground-engaging position and means for deforming said linkages to retract said wheels from said ground-engaging position, mechanism for steering said wheels in parallel planes about their laterally spaced axes, and centering means connected to said steering mechanism to move said wheels parallel to the longitudinal axis of said aircraft when pressure is relieved from said steering mechanism, said steering mechanism including pivotal connections so arranged that said centering means maintains said wheels parallel to the longitudinal axis of the aircraft as said wheels are retracted.

4. In an aircraft, a landing gear comprising a pair of deformable parallelogram linkages extending laterally from said aircraft, wheels carried by said linkages and laterally spaced from each other, means for maintaining said linkages in an extended wheel ground-engaging position and means for deforming said linkages to retract said wheels from said ground-engaging position, mechanism for steering said wheels in parallel planes about their laterally spaced axes, and centering means connected to said steering mechanism to move said wheels parallel to the longitudinal axis of said aircraft when pressure is relieved from said steering mechanism, said steering mechanism including pivotal connections arranged in planes including the opposite sides of said parallelogram linkages whereby said centering means maintains said wheels parallel to the longitudinal axis of the aircraft as said wheels are retracted.

5. In an aircraft, the combination of a landing gear comprising vertically spaced parallel members pivotally attached to pivot pins carried by said aircraft, a wheel carrying spindle arm attached to said members by means of pivot pin connections, a steerable wheel mounted on said arm, steering means including linkage extending from operative connection to said wheel having pivotal connections lying in the plane of said pivot pins and the plane of said pivot pin connections when said steering means are centered, and means for centering said steering means when steering pressure is relieved therefrom.

6. In an aircraft, the combination of a retractable landing gear structure comprising vertically spaced parallel members pivotally attached to vertically spaced pivot pins carried by said aircraft, a wheel carrying spindle arm attached to said members by means of pivot pin connections, means operatively connected to said structure for retracting said landing gear, a landing wheel pivotally mounted on said spindle arm, and steering means including linkage carried by said structure having pivotal connections lying in the plane of said pivot pins and the plane of said pivot pin connections when said steering means are centered.

7. In an aircraft, the combination of a retractable landing gear structure comprising vertically spaced members pivotally mounted on pivot pins carried by said aircraft, adapted thereby to be moved between retracted and extended positions, a wheel carrying spindle arm attached to said members by means of pivot pin connections, means operatively connected to said structure for retracting said landing gear, a landing wheel steerably mounted on said spindle arm, and steering means including linkage having pivotal connections lying in the plane of said pivot pins and the plane of said pivot pin connections when said steering means are centered.

8. In an aircraft, a landing gear comprising vertically spaced parallel members pivotally attached to pivot pins carried by said aircraft, a spindle arm attached to said members by means of pivot pin connections, a wheel carried by said spindle arm, means for retracting said landing gear by rotation of said members about said pivot pins, a pair of arms fixedly mounted upon one of said pivot pin connections, one of said arms being connected to said wheel for steering purposes and the other of said arms being pivotally connected to a push-pull link, a lever pivotally mounted upon said aircraft and pivotally connected to said push-pull link, the pivotal connections of said push-pull link lying in the planes of said pivot pins and said pivot pin connections whereby retraction of the gear is accomplished without causing deflection of said wheel concurrent therewith.

References Cited in the file of this patent
UNITED STATES PATENTS

| | | |
|---|---|---|
| 925,536 | Umholtz | June 22, 1909 |
| 1,252,282 | McIntyre | Jan. 1, 1918 |
| 1,653,061 | Pedersen | Dec. 20, 1927 |
| 2,006,387 | Sksergian | July 2, 1935 |
| 2,096,535 | Bellanca | Oct. 19, 1937 |
| 2,157,963 | Mercier | May 9, 1939 |
| 2,219,645 | Bartho | Oct. 29, 1940 |
| 2,323,640 | Armstrong | July 6, 1943 |
| 2,340,237 | Upson | Jan. 25, 1944 |
| 2,438,650 | Saulnier | Mar. 30, 1948 |
| 2,444,319 | Winter | June 29, 1948 |
| 2,452,787 | Patch | Nov. 2, 1948 |
| 2,483,027 | Van Zelm | Sept. 27, 1949 |
| 2,523,598 | Smith | Sept. 26, 1950 |
| 2,554,261 | Munger | May 22, 1951 |
| 2,589,434 | Robert | Mar. 18, 1952 |
| 2,643,112 | Smith | June 23, 1953 |
| 2,644,654 | Mercier | July 7, 1953 |
| 2,652,214 | Cussons | Sept. 15, 1953 |
| 2,659,555 | Schlender | Nov. 17, 1953 |